US 9,183,485 B2

(12) United States Patent
Bosquet

(10) Patent No.: US 9,183,485 B2
(45) Date of Patent: Nov. 10, 2015

(54) MICROCIRCUIT MODULE OF REDUCED SIZE AND SMART CARD COMPRISING SAME

(75) Inventor: Olivier Bosquet, Vitre (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/123,795

(22) PCT Filed: Jun. 8, 2012

(86) PCT No.: PCT/FR2012/051292
§ 371 (c)(1),
(2), (4) Date: Dec. 4, 2013

(87) PCT Pub. No.: WO2012/168666
PCT Pub. Date: Dec. 13, 2012

(65) Prior Publication Data
US 2014/0117097 A1    May 1, 2014

(30) Foreign Application Priority Data
Jun. 10, 2011    (FR) ...................... 11 55132

(51) Int. Cl.
*G06K 19/077*    (2006.01)
*G06K 7/00*    (2006.01)

(52) U.S. Cl.
CPC ........ *G06K 19/07743* (2013.01); *G06K 7/0013* (2013.01); *G06K 7/0021* (2013.01); *G06K 19/07733* (2013.01)

(58) Field of Classification Search
CPC .................. G06K 19/07733; G06K 19/07728
USPC ........................................................ 235/492
See application file for complete search history.

(56) References Cited

U.S. PATENT DOCUMENTS

| 6,054,774 A | 4/2000 | Ohmori et al. |
| 6,568,600 B1 * | 5/2003 | Carpier et al. ................ 235/492 |
| 6,634,565 B2 | 10/2003 | Gray |
| 2005/0212690 A1 | 9/2005 | Nishikawa |
| 2010/0038438 A1 | 2/2010 | Kim |
| 2010/0072284 A1 * | 3/2010 | Nishizawa et al. ........... 235/492 |

FOREIGN PATENT DOCUMENTS

| EP | 0 409 241 | 1/1991 |
| EP | 1 816 593 | 8/2007 |
| WO | 00/43951 | 7/2000 |

OTHER PUBLICATIONS

ISO/IEC. ISO/IEC 7816-2. 2nd Ed. Oct. 15, 2007.*
International Search Report dated Nov. 5, 2012, corresponding to PCT/FR2012/051292.
ISO/IEC 7816-2: Information Technology-Integrated Circuits(s) Cards with Contacts—Part 2: Dimensions and location of the Contacts; International Standard ISO/IEC; Vojl. 7816-2; Mar. 1, 1999; pp. 1-5; XP007918489.

* cited by examiner

Primary Examiner — Thien T Mai
Assistant Examiner — Toan Ly
(74) Attorney, Agent, or Firm — Young & Thompson

(57) ABSTRACT

A microcircuit module for a smart card includes a generally rectangular carrier film (101) provided with eight contact pads on a first face thereof and with an electronic component on a second face, the electronic component being equipped with connection terminals to which the contact pads are connected via the carrier film. The eight contact pads are disposed in two parallel series of three contact pads (C1, C2, C3, C5, C6, C7), with two other contact pads (C'4, C'8) being disposed therebetween and each being positioned close to the contact pads from the ends of each of the series. The contact pads each measure at least 1.7 mm×2 mm. The contact pads of the two parallel series comply with ISO standard 7816 and the eight contact pads border each of the sides of the carrier film.

20 Claims, 3 Drawing Sheets

Figure 2:
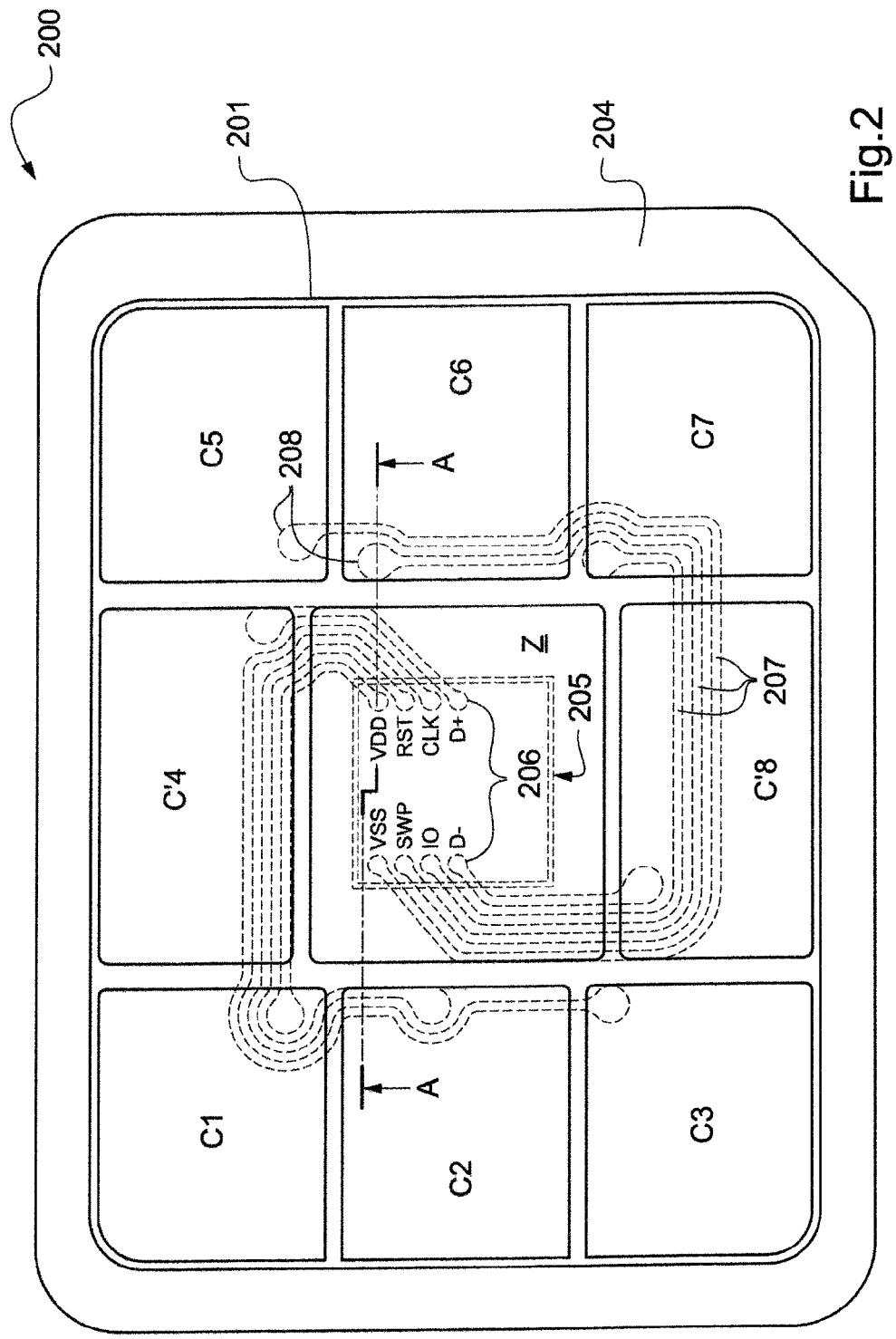

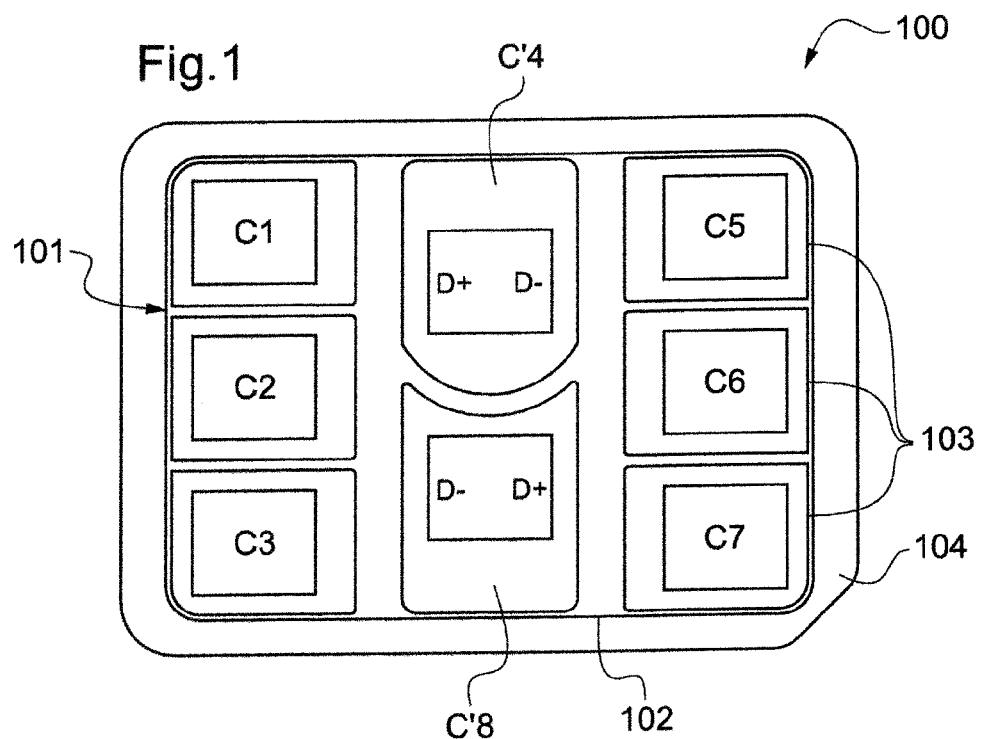
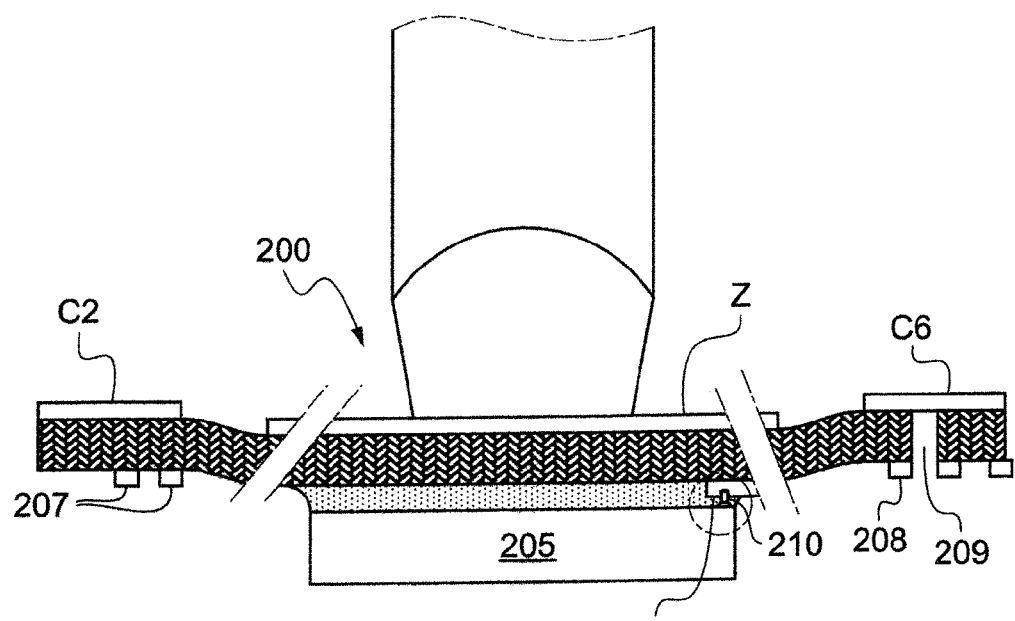

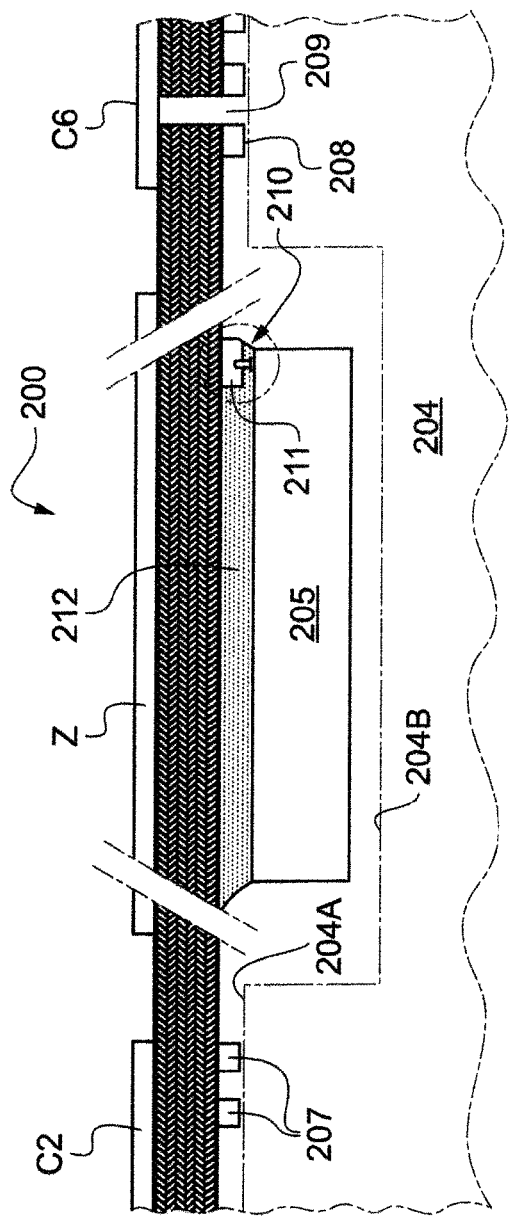

MICROCIRCUIT MODULE OF REDUCED SIZE AND SMART CARD COMPRISING SAME

The invention relates to a smart card module and a smart card with external contacts comprising such a module.

As is well known, a smart card module comprises a thin-layer carrier film, one face of which, called the outer face (as it is intended to be accessible from outside the smart card that will be equipped with said module), comprises contact zones in a well-defined configuration and the other face, called the inner face (as it is intended to be oriented towards the inside of a cavity made in the card for receiving the module) carries a microcircuit, with contact pads connected electrically to at least one part of the contact zones of the outer face.

The configuration of the contact zones of the outer face usually complies with standard ISO 7816, which specifies the presence of eight contact zones distributed in two parallel series of four contact zones having well-defined functions; these contact zones are usually denoted by the references C1 to C8:

- contact zone C1 being intended to receive a supply voltage denoted Vcc (or Vdd),
- contact zone C2 being intended to receive an initializing signal denoted RST,
- contact zone C3 being intended to receive a clock signal denoted CLK,
- contact zone C4 being intended to receive a signal that depends on the intended application (the standard refers to a future application),
- contact zone C5 being intended to receive an earth voltage denoted GND (or Vss),
- contact zone C6 being intended to receive a memory card programming voltage denoted VPP,
- contact zone C7 being intended to receive a data exchange input/output signal, and
- contact zone C8 being intended to interact with zone C4 depending on the intended application.

Contact zones C4 and C8 have not always been used in the past, but are being used increasingly, in particular for USB communications, or for SPI communications.

In fact a recent version of standard ISO 7816 (version 7816-2&10&12) states that pad C4 can have a reset, write or read function, or a function of D+ terminal for a USB function, whereas pad C8 can have a function of D− terminal for a USB function.

In addition, standard ISO 7816 fixes the mutual positioning of the various contact zones, as well as the minimum dimensions of these contact zones, namely 2 mm wide and 1.7 mm high (by convention, the pads are arranged in vertical series, near the short sides of the carrier film (which has an overall rectangular shape with rounded corners).

The smart cards comprise a body in which a cavity is made for receiving said module. Standard ISO 7816 also specifies the configuration of such a module within said card body.

This card body can have several formats, which are also standardized. Thus, three important standardized formats are used, known by the following references (see in particular standard ETSI TS 102 221 and standard ISO 7816):

- ID-1 having a length of 85.6 mm, a width of 54 mm, and a thickness of 0.76 mm; this format is sometimes denoted 1FF (for "first form factor"),
- ID-000 (also called Plug-in UICC, or GSM SIM card) having a length of 25 mm, a width of 15 mm, and the same thickness of 0.76 mm; this format is sometimes denoted 2FF (for "second form factor"),
- Mini-UICC (sometimes also called new SIM card), with a length of 15 mm, a width of 12 mm and the same thickness of 0.76 mm; this format is sometimes denoted 3FF (for "third form factor").

It should be pointed out that the concepts of length and width are defined by reference to the orientation of the microcircuit.

There is a trend towards miniaturization of smart cards, and there is already talk of a fourth format, even smaller, which would be called 4FF.

It will be understood, however, that this trend towards miniaturization is limited by the fact that it is desirable to continue to adhere to the aforementioned standards for as long as possible, and that the fact of wanting to provide smart cards with a constantly increasing number of functions prevents significant miniaturization of the components that have to be fixed on the rear face of the modules.

This concern for multiplying the functions provided in a smart card leads, moreover, to a desire to increase the number of contact pads beyond the eight contact zones defined by standard ISO 7816.

Thus, the principle of arranging series of additional contact zones, duplicating the series of usual zones, or alternating with the latter, is known from document EP-0 409 141 (Toshiba).

A configuration with two series of contact zones intended to be connected to an underlying circuit, with two contact zones arranged between these two series of contact zones and intended to be connected to an antenna arranged in the card body, is also known from document WO-2000/043951 (Bull et al.).

Moreover, the principle of arranging, between two series of contact zones complying with standard ISO 7816, a central series of contact zones intended to permit additional input/output connections, or additional functions, is known from document U.S. Pat. No. 6,634,565 (Gray). A suitable design of the printed circuit arranged on the rear of the film of the module makes it possible, in combination with flip-chip assembly of the electronic component, to utilize the space between the series of usual contact zones, to arrange additional contact zones there.

Moreover, a smart card connector having two parallel series of contact pads and at least one additional contact pad placed between the two series and extending in the prolongation of a pad of one of the aforementioned series, in the direction of a median line positioned at equal distance from these series, without going beyond this median line, which permits good compatibility with conventional card readers, is known from document EP-1 816 593 (Axalto).

Moreover, a configuration of contact pads of complex geometry permitting easy connection with a great variety of electronic components (there are not only contact pads complying with standard ISO 7816, but also additional pads intended for connection to an antenna, arranged on the outside of the assembly of the two series of contact pads), is known from document US-2010/038438 (Kim et al.).

According to a more mechanical approach (without particularly aiming to obtain additional contact zones), the principle of arranging, between series of contact zones, one or two zone(s), isolated or connected to one of the aforementioned zones, such that any line passing through the set of zones necessarily passes through one of them, which contributes to the rigidity of the whole (the configuration of the contact zones does not seem to tend to follow a particular standard), is known from document U.S. Pat. No. 6,054,774 (Ohmori et al.).

It should be noted that none of the documents cited deals with reducing the dimensions of the module while seeking to observe as far as possible the configuration constraints set by the current standards.

The invention relates to a smart card module permitting size reduction below the 3FF format, while observing as far as possible the constraints set by the standards such as standard ISO 7816, and promoting, in addition, good mechanical performance.

For this purpose, the invention proposes a smart card microcircuit module comprising a carrier film provided, on a first face, with eight contact pads suitable for being brought in contact with an external element and, on a second face, with an electronic component equipped with connecting terminals to which the contact pads are connected via the carrier film, these eight contact pads being arranged in two parallel series of three contact pads between which two other contact pads are positioned, these series of contact pads each being aligned parallel to one and the same direction of the carrier film in such a way that the contact pads of one of the series are respectively opposite, transversely to said direction, to the contact pads of the other one of the series, the other two contact pads being respectively positioned near the contact pads forming the ends of each of the series, the contact pads each having, parallel to said direction, a dimension of at least 1.7 mm and, transversely to this direction, a dimension of at least 2 mm, the contact pads of the two parallel series complying with the provisions of standard ISO 7816 as regards the pads denoted C1 to C3 and C5 to C7 in this standard, these eight contact pads jointly bordering each of the sides of the carrier film.

It should be noted that what is called carrier film here is also called, depending on the circumstances, insulating substrate, or sticker, or flexible plate, etc.

The statement that the eight contact pads jointly border each of the sides of the carrier film means that each pad is located at a distance from such an edge that is of the same order as the spacing between these pads; in other words, the eight contact pads have a configuration such that their outer edges form a rectangle located in the immediate vicinity of each of the edges of the carrier film; thus, the space requirement of the contact pads on the carrier film represents almost all (at least 80%, or even 90%) of the surface of the carrier film.

Thus, the invention teaches abandoning the conventional arrangement, imposed by standard ISO 7816, of series of four contact zones, while preserving many geometric provisions of this standard. Indeed, the standard associates the contact pads denoted C4 and C8 (according to this standard) with a "future" application, to the point that some people have believed it possible to regard these pads as being optional. Thus, document EP-1 819 593 envisages it, very evasively, without giving the least justification of the principle of eliminating pads called optional while adding additional pads; it may be noted in this connection that, in the examples of the number of additional pads recommended, this document mentions 1, 3 or 4, but not 2. However, such a configuration with two series of three contact pads only is not known in combination with other pads having the role of pads C4 and C8. In fact it can be considered that the invention teaches displacing, in a particularly way, pads C4 and C8, between the series of three pads, C1-C3 on the one hand, and C5-C7 on the other hand.

It will be understood that such an arrangement makes it possible to give the module a more compact form than the existing modules with eight contact pads, without requiring a decrease in the individual surface area of these contact pads; as a result the invention allows a reduction in the dimensions of the module, while complying with a large part of standard ISO 7816, making it possible to envisage a decrease in size of the smart cards equipped with such modules, while retaining a great many of the current manufacturing practices.

Moreover, had it not been for the divergence from the many provisions of standard ISO 7816, a person skilled in the art would have been more likely to consider reducing the surface areas of the contact pads by a scaling process, rather than moving them.

However, the fact that, according to the invention, the size of the contact pads is not reduced, has the advantage that the accuracy constraints in the operations of component assembly are not increased relative to the existing manufacturing processes, even in the case of a reduction in size of the module.

In addition, in combination with the current trend for miniaturizing smart cards, it is felt necessary to ensure, as far as possible, compatibility with the existing formats, 3FF or greater; it is interesting to note in this connection that the configuration taught by the invention complies with standard ETSI 102 221 v8.20 governing the format of GSM cards.

Preferably, component assembly is by flip-chip assembly, the carrier film having, on said other face, electrically conductive tracks connected respectively to the eight contact pads via the carrier film and having connecting pads opposite the connecting terminals of the component to which they are fixed.

It is important to note that flip-chip assembly of the components within the modules is much less common than assembly with wire connection, called wire-bonding, as the latter has the great advantage of allowing a carrier film to be prepared with its contact pads independently of the geometry of the electronic component that is subsequently to be fixed on it, which allows very high throughputs, as a simple change in parameterization in the wire connections makes it possible to change the type of components. In contrast, flip-chip assembly requires specialization of the carrier film at an early stage of production of the module, since the tracks must take account of the geometry of the connecting terminals of the future electronic component. Moreover, since the components are thus assembled in a very great majority of cases by wire-bonding, the configuration of the connecting terminals of these components is selected by their manufacturers so as to facilitate this type of assembly; however, this configuration complicates the design of the tracks to be provided on the rear face of the carrier film for flip-chip assembly (the component is then mounted in reverse relative to wire-bonding assembly); it will thus be understood that a person skilled in the art would a priori have tended to retain the arrangement of the eight contact pads of the modules in two parallel series of four pads, if this enabled him to retain wire-bonding assembly.

In fact, since the arrangement of the contact pads is such that each of them is close to an edge of the carrier film, it would have been possible to retain wire-bonding assembly, since in this way each of the contact pads is opposite, via the carrier film, to a rear zone that is not covered by the component and is therefore available for wire-bonding assembly; however, flip-chip assembly offers better compactness, in thickness, for the module.

It can be envisaged that the component is only fixed to the carrier film via the connecting terminals of this component and connecting pads located opposite on the rear face of the film; however, it is preferable to supplement this mechanical bonding provided by the electrical connection with an interposed material filling the space between this carrier film and the opposite face of the component (conventionally this material is called underfiller); in a manner known per se, depending on requirements, the latter can be electrically insulating, or electrically conducting (anisotropically, only parallel to the electrical connections). It will be understood that the presence of said interposed material helps to ensure good rigidity of the module during placement of the component.

Preferably, the carrier film comprises, on its first face, a reinforcing zone facing, through this film, the whole component. This has an important advantage from the mechanical standpoint, since in this way the stresses that may be applied to the future smart card present hardly any risk that bending will degrade the component or its fixation within the module. It has to be understood that, with miniaturization of the modules and smart cards, the module tends to occupy an increased fraction of the surface of the smart card; since, in practice, the cards are produced within larger bodies, from which these cards are then separated by fracture of breakable bonds, a consequence of this miniaturization being that the module is increasingly stressed when these separating forces are applied.

Advantageously, the contact pads arranged on the first face of the carrier film are formed within a metallic layer, the reinforcing zone having the same thickness and the same composition as the contact pads. Thus, since the contact pads are conventionally delimited by etching of a metallic layer on its entire thickness, formation of this reinforcing zone can be carried out in the same way, preferably at the same time. It should be noted that this operation of delimiting the connecting pads can be accompanied by a step of forming additional material so as to increase the thickness of the reinforcing zone relative to that of the connecting pads.

According to an embodiment of the invention, the reinforcing zone is integral with one of said other contact pads, i.e. the reinforcing zone and this pad can extend one into another without discontinuity; as a variant, it can be integral with one of the contact pads of one of the series, for example a pad forming the earth (the mechanical/electrical connection between the reinforcing zone and said pad can be provided by a right-angled or rounded zone). However, preferably, the reinforcing zone is electrically insulated with respect to each of the contact pads. In fact, said electrical insulation is accompanied by the fact that this reinforcing zone is separated from the contact pads by narrow strips of the carrier film that are not covered (by the material constituting the connecting pads or the reinforcing zone), which amounts to stating that the reinforcing zone is then mechanically independent of the connecting pads, these narrow strips forming zones that bend easily, helping to minimize the bending forces to which the reinforcing zone, and therefore the component on the other side of the carrier film, may be subjected. Advantageously, parallel to said direction of the carrier film, the reinforcing zone has a larger dimension (by several percent for example) than that of the contact pads located in the middle of the series of contact pads, which contributes, conversely, to imparting a certain rigidity to the module as a whole, while allowing the aforementioned advantages of mechanical performance.

Advantageously, said other two contact pads are dedicated to a USB communication function, which constitutes a function of increasing interest in practice.

It should be noted that the configuration of the contact pads in series of three-two-three pads is not in any way incompatible with the fact that connecting terminals of the component to which the eight contact pads are connected are distributed in two parallel series of four connecting terminals. This amounts to stating that implementation of the invention does not involve a change in the configurations of the existing components, despite the change in configuration of the eight contact pads. In fact the configuration of the contact pads according to the invention does not impose anything regarding the locations of the connecting terminals.

The invention also proposes a smart card comprising a module of the aforementioned type, comprising a card body in which a cavity is made, comprising a deep part suitable for receiving the electronic component, which is surrounded by a peripheral part of reduced depth to which the module is fixed on its periphery.

Preferably, all eight contact pads are opposite this peripheral part (it follows that the deep portion of the cavity is just larger, parallel to the carrier film of the module, than the component). This allows a good increase in rigidity of the smart card, even when the card body is just larger (parallel to the carrier film) than the module; moreover, this contributes to the mechanical performance of the card when forces are applied, in particular during its separation from a larger substrate, since this has the effect of localizing the effects of such forces between the contact pads and the component, in the form of bending of the carrier film; this is particularly noticeable when there is a reinforcing zone and when the latter is mechanically independent of the connecting pads. This advantage exists even when the component is mounted by flip-chip assembly, in which case the tracks are partly sandwiched between this shallow peripheral part and the periphery of the carrier film (these tracks are sufficiently flexible to be able to withstand bending at the level of the narrow strips located between the contact pads and the component).

The aforementioned features are particularly beneficial for making a smart card the body of which has dimensions that are smaller than those of the 3FF format, i.e. less than 15 mm×12 mm (the module can then occupy more than 80% (or even 90%) of these dimensions).

It will be understood that the arrangement of the contact pads of a module or of a card is reflected, face to face, in the arrangement of the contactors of a reader configured for connecting to such a module or such a card. The invention thus proposes, in addition, a reader configured for connecting to at least one of said two other contact pads of a module (or of a card) as defined above.

Objectives, features and advantages of the invention can be seen from the description given below as a non-limitative example for purposes of illustration, with reference to the appended drawings, in which:

FIG. 1 is a top view of a smart card provided with a first module according to the invention, FIG. 2 is a top view of another smart card provided with a second module according to the invention, the component and the connecting tracks being seen by transparency, FIG. 3 is a partial sectional view thereof along line A-A in FIG. 2, FIG. 4 is a variant of FIG. 3, and FIG. 5 is a partial sectional view of the card in FIGS. 2 and 3 in the case when compression forces are applied.

It must be understood that these drawings are not to scale, for reasons of legibility; in particular, the thickness of the module is much less than its lateral dimensions, which in particular explains interruption zones on either side of the module, in FIGS. 3 to 5.

In general, the figures show examples of smart cards according to the invention, which therefore comprise modules that are also according to the invention. The card shown in FIG. 1 is denoted by the general reference 100 whereas the card shown in FIGS. 2, 3 and 5 is referenced 200, the variant in FIG. 4 having references based on those used in the preceding figures, but followed by a prime symbol.

More precisely, each of the cards 100 or 200 comprises a smart card microcircuit module comprising a carrier film of overall rectangular shape provided with:

- on a first face, eight contact pads suitable for being brought in contact with an external element and,
- on a second face, an electronic component equipped with connecting terminals to which the contact pads are connected through the carrier film.

According to the invention, these eight contact pads are arranged in two parallel series of three contact pads, between which two other contact pads are located; these series of contact pads are each aligned parallel to one and the same direction of the carrier film in such a way that the contact pads of one of the series are respectively opposite, transversely to said direction, to the contact pads of the other of the series; the other two contact pads are respectively positioned near the contact pads forming the ends of each of the series. The contact pads each have, parallel to said direction, a dimension of at least 1.7 mm and, transversely to this direction, a dimension of at least 2 mm; the contact pads of the two parallel series comply with the provisions of standard ISO 7816 as regards the pads denoted C1 to C3 and C5 to C7 in this standard. These eight contact pads jointly border each of the sides of the carrier film.

Thus, card 100 comprises a module denoted 101 comprising a carrier film 102 equipped with contact pads 103 arranged on a so-called external face of the module, i.e. on the face of the carrier film that is visible from the outside when the module is mounted and fixed inside the card; these contact pads are suitable for being brought in contact with an external element, in practice a card reader (not shown).

This module 101 is fixed to a card body denoted 104, which it may be noted is just larger than the module.

The contact pads 103 carried on the outer face of the carrier film are eight in number, as in a module complying with standard ISO 7816, but in an arrangement that differs from this standard with regard to two of the pads (see below).

On its opposite face (not visible from outside), the carrier film carries an electronic component (not visible in FIG. 1) equipped with connecting terminals to which the contact pads are connected through the carrier film (this will be described in connection with the example in FIG. 2).

The eight pads 103 are distributed in two parallel series of three contact pads and in an intermediate series of two pads.

The contact pads of said series are denoted C1, C2 and C3, on the left, and C5, C6 and C7, on the right; these series of contact pads are each aligned parallel to one and the same direction of the carrier film (vertical in FIG. 1), in such a way that the contact pads of one of the series are respectively opposite, transversely to said direction, to the contact pads of the other of the series; in other words, pad C1 is opposite, transversely to the vertical direction, to pad C5, pad C2 is opposite pad C6 and pad C3 is opposite pad C7.

As for the other two contact pads, they are respectively positioned near the contact pads forming the ends of each of the series; they provide the same functions as could be provided by pads C4 and C8 of a usual combination of eight pads; they are denoted C'4 and C'8 so as to reflect this similarity, the prime symbol indicating that they are not, however, completely identical (on account of their locations) to said pads C4 and C8.

In the example considered here, pads C'4 and C'8 are dedicated to a USB communication function, which complies with the purpose of pads C4 and C8 as defined in the recent version of standard ISO 7816-12. This purpose is indicated by the marks D+ and D− shown on these pads.

The eight contact pads each have, parallel to said direction, a dimension of at least 1.7 mm and, transversely to this direction, a dimension of at least 2 mm; moreover, the contact pads of the two parallel series comply with the provisions of standard ISO 7816 as regards the pads denoted C1 to C3 and C5 to C7 in this standard. It follows from this that the eight pads comply with the provisions of standard ISO 7816 except as regards the location of pads C'4 and C'8.

These eight contact pads jointly border each of the sides of the carrier film. In other words, the space requirement of the eight pads is just less than the area of this carrier film, the set of eight contact pads being such that each of the sides of the sticker is bordered by edges of three contact pads.

It may be noted that the contact pads C'4 and C'8 have in this case a spacing of the same order of magnitude (just of the order of double) as the spacing existing between the pads of the parallel series.

As an indication of dimensions, the rectangles shown within the contact pads represent the minimum dimensions stipulated by standard ISO 7816.

It will be understood that it is possible to vary (in the opposite direction) the surface areas of the contact pads C'4 and C'8 while remaining within the scope of the invention; in particular (this will be pointed out later in connection with the next figures), one of the pads can extend as far as a dimension corresponding overall to the space requirement (in the vertical direction of the sticker) of a group of two lateral contact pads; for example pad C'8 can be extended until it has a similar vertical space requirement to that of pairs C2-C3 or C6-C7.

FIG. 2 shows another embodiment example of a smart card according to the invention, and therefore another embodiment example of a module according to the invention.

The elements in this figure that are analogous to elements in FIG. 1 (apart from the names given to the contact pads, set by or derived from standard ISO 7816) are assigned reference symbols that are derived from the reference symbols in FIG. 1 by adding the number 100.

Thus, card 200 comprises a module denoted 201 comprising a carrier film 202 provided with contact pads 203 arranged on a so-called outer face of the module, and this module is fixed to a card body denoted 204, which it may be noted is just larger than the module.

As before, the contact pads 103 carried on the outer face of the carrier film are eight in number, distributed in two parallel series C1-C2-C3 and C5-C6-C7, on either side of pads C'4 and C'8, as in the example in FIG. 1, complying with the same provisions of standard ISO 7816 as the pads in FIG. 1.

As before, pads C'4 and C'8 are advantageously dedicated to a USB communication function.

As before, these eight contact pads jointly border each of the sides of the carrier film. In other words, the space requirement of the eight pads is just less than the area of this carrier film, the set of eight contact pads being such that each of the sides of the sticker is bordered by edges of three contact pads.

On its opposite face (not visible from outside), the carrier film carries an electronic component 205 equipped with connecting terminals to which the contact pads are connected through the carrier film.

In contrast to FIG. 1, FIG. 2 shows a zone Z located between the contact pads C'4 and C'8.

FIG. 2 shows, by transparency through the carrier film, component 205, as well as its connecting terminals 206; it also shows connecting tracks 207 having end zones (here broadened and rounded), which are denoted 208.

In this example, the electronic component is in fact mounted by flip-chip assembly, i.e. its connecting terminals

206 are located on the face of the component facing the carrier film; these terminals are each connected by a track 207 to an end zone 208 located under a contact pad. In a manner that is known per se in connection with flip-chip assembly, these end zones are connected (see FIG. 3) by vias 209 to the contact pad positioned opposite on the front of the carrier film. As is known, these vias are holes passing through the carrier film, the wall of which is metallized to provide an electrical connection between these end zones and these contact pads; these holes are blind in the sense that they pass through the carrier film, but not the contact pads.

It can be seen that, partly in accordance with the standard:
the terminal called Vdd is connected to pad C1,
the terminal RST is connected to pad C2,
the terminal CLK is connected to pad C3,
the terminal Vss is connected to pad C5,
the terminal SWP is connected to pad C6, and
the terminal I/O is connected to pad C7.
By analogy with standard ISO 7816:
the terminal D+ is connected to pad C'4, and
the terminal D− is connected to pad C'8.

It may be noted that, although the contact pads are arranged in three series of three-two-three contact pads, the component can have the conventional configuration of two series of four connecting terminals along two opposite sides of this component (in fact the configuration of the terminals on the component is not critical).

It should be noted that wire-bonding assembly between the connecting terminals of the component and the contact pads is an alternative for assembly of the component.

Advantageously, zone Z has a location and a surface area such that it is opposite, through the carrier film, to the whole component.

This zone Z has, in the example presented here, a thickness (see FIG. 3) equal to that of the contact pads; in fact, a practical way of producing this zone Z and the contact pads consists of forming an electrically conductive layer on the face of the carrier film and of etching this layer so that the contact pads and zone Z are delimited there. It will be understood that it is also possible to provide a larger (or smaller) thickness for this zone Z.

As will be mentioned in connection with FIG. 5, this zone Z has a role as reinforcement with respect to the component.

In the example shown in FIG. 3, the terminals of the component that are connected to the ends of the tracks (called connecting pads 211) are formed by feet, called bumps 210.

In a manner that is known per se, these bumps can have a tapered shape (with decreasing cross section starting from the component), so as to be able to penetrate into the corresponding pad 209 during application of the compressive forces for purposes of assembly.

This penetration can be enough to provide electrical connection between the component and the tracks 207 situated on the back of the carrier film, as well as a good mechanical bond between said component and said carrier film.

However, advantageously, there is in addition, sandwiched between this carrier film and the face of the component that is opposite to it, a filling material 212 (conventionally called underfiller) which enhances the mechanical durability. Such an underfiller can comprise electrically conducting particles.

FIG. 4 shows a module fixed to the carrier film just by the aforementioned bumps, therefore without underfiller. The elements in FIG. 4 that are analogous to those in FIG. 3 are denoted in FIG. 4 by references derived from those in FIG. 3 by adding a prime symbol.

As a variant that is not shown (also known per se), electrical connection can be provided by electrolytic bumps, i.e. formed by electrolysis, which have the particular feature that their cross section is roughly constant; in such a case, the presence of an underfiller is in practice necessary to ensure the desired mechanical durability.

As indicated in FIG. 3, the card body 204 comprises a cavity receiving the module in such a way that the contact pads are flush with the upper face of this body. Such a cavity is formed conventionally with a deep part and a peripheral part, surrounding this deep part, having a smaller depth; in practice the central part has a sufficient depth for accommodating the component, whereas the peripheral part has a depth just sufficient to receive the periphery of the carrier film, being attached to it by an adhesive (or any other fixing element).

Advantageously, this peripheral part denoted 204A extends with respect to the set of eight contact pads, but not with respect to zone Z (in other words, the deep part of the cavity is just larger than the component).

FIG. 5 makes it possible to visualize the benefit of the presence of the reinforcing zone Z. It will be understood that when a force is applied to press the module towards the bottom of its cavity, zone Z has the advantage on the one hand of distributing this force over a significant portion of the carrier film, which minimizes the risks of degradation of the latter. Moreover, this zone Z has the advantage of minimizing the bending forces imposed on the component and on its electrical connections with the carrier film, which constitutes an appreciable protective role.

If, in addition, the contact pads are opposite the peripheral part of the cavity, it will be understood that, since the periphery of the carrier film is fixed to this peripheral part of the cavity, it therefore follows that the contact pads are fixed more or less rigidly to this peripheral part, which also minimizes the bending forces imposed on these contact pads.

In fact, the main pressing forces to which the module may be subjected are translated into bending forces at the level of the narrow uncoated strips separating the various contact pads with respect to the reinforcing zone Z; since these zones are not covered, they constitute the most flexible parts of the carrier film, able to withstand these bending forces without degradation.

It may be noted that this reinforcing zone Z has, parallel to the direction of the series of three pads (perpendicular to the plane of FIG. 3), a dimension that is advantageously slightly greater than the analogous dimension of contact pads C2 and C6 between which this zone Z is located. This contributes to establishing a good compromise between the need for rigidity of the module and flexibility during pressing.

This pressing force is in particular applied at the time of separating the card body from a larger substrate within which the card was formed. The pressing forces may be applied by the pad of a finger, but also by a tool, which justifies the concern to ensure good mechanical durability.

It may be noted that the fact that almost the whole surface of the visible face of the module is covered by the contact pads and zone Z has the additional advantage of protecting the carrier film with respect to a certain number of external aggressive factors.

It will be understood that zone Z can, as a variant, be integral with one of the pads, i.e. zone Z can consist of one of the contact pads, preferably one of pads C'4 or C'8, which would extend without discontinuity to the median part of the visible face of the carrier film (in other words, there would not be any demarcation between a portion forming a contact pad and a portion forming reinforcement). The role of mechanical reinforcement and protection of the component with respect to the bending forces would then also be obtained, despite less flexibility between the portion serving as contact pad and that serving as reinforcement. As a variant, zone Z can be connected to one of the contact pads of one of the series, for example to the earth pad C5 (to do this it is sufficient to reduce the horizontal dimension, in FIG. 2, of pad C'4). An intermediate option would be to provide a constriction of the layer forming this zone, between its reinforcing portion and its portion forming the contact pad.

As an example, the carrier film is made of PET, or even of FR4 or of PI, and its thickness can be about 50 microns (or even more, for example between 50 and 100 microns), and the contact pads as well as the connecting tracks are of copper, with a thickness of a few microns.

It will be understood that the invention is of quite particular benefit in the case of smart cards with a format smaller than the format called 3FF, i.e. less than 15 mm×12 mm.

A person skilled in the art will be able to adapt the configuration of the contact zones of a card reader to enable connection to a module, or to a card, according to the invention, by locating, in particular, at least one contact zone opposite one of said other contact zones C'4 or C'8 of the module or card (depending on requirements, it is possible not to use one or other of zones C'4 or C'8, or on the contrary use both of them); thus, the reader is configured for connecting to at least one of said other contact pads; preferably there are two contact zones opposite each of said other contact zones, respectively. For this purpose, it may for example be sufficient simply to displace the contact zone intended for zone C'4 and/or that intended for zone C'8, without changing the locations of the contact zones intended for connecting to contact zones C1 to C3, C5 to D7. In other words, such a reader comprises a plurality of contact zones suitable for connecting to a plurality of the contact zones of the module, the relative arrangements of the contact zones of the reader following from those of the contact zones of the module, according to a mirror effect.

The invention claimed is:

1. Smart card microcircuit module comprising:
a carrier film (101, 201) of overall rectangular shape provided on a first face with a total of eight contact pads suitable for being brought in contact with an external element and, on a second face, with an electronic component (205) equipped with connecting terminals (210) to which the contact pads are connected through the carrier film, these eight contact pads being arranged in two parallel series of three contact pads (C1, C2, C3, C5, C6, C7) between which two other contact pads (C'4, C'8) are situated, these series of contact pads each being aligned parallel to one and the same direction of the carrier film in such a way that the contact pads of one of the series are respectively opposite, transversely to said direction, to the contact pads of the other of the series, the other two contact pads being respectively positioned near the contact pads forming the ends of each of the series, the contact pads each having, parallel to said direction, a dimension of at least 1.7 mm and, transversely to this direction, a dimension of at least 2 mm, the contact pads of the two parallel series complying with the provisions of standard ISO 7816 as regards the pads denoted C1 to C3 and C5 to C7 in this standard, these eight contact pads jointly bordering each of the sides of the carrier film.

2. Module according to claim 1, characterized in that the component is mounted by flip-chip assembly, the carrier film having, on said other face, electrically conducting tracks (207) respectively connected to the eight contact pads through the carrier film and having connecting pads (211) opposite the connecting terminals of the component to which they are fixed.

3. Module according to claim 2, characterized in that the mechanical bond provided by the electrical connection is supplemented with an interposed material (212) filling the space between this carrier film and the opposite face the component.

4. Module according to claim 1, characterized in that the carrier film comprises, on its first face, a reinforcing zone (Z) facing, through this film, the whole component.

5. Module according to claim 4, characterized in that the contact pads arranged on the first face of the carrier film are formed within a metallic layer, the reinforcing zone has the same thickness and the same composition as the contact pads.

6. Module according to claim 5, characterized in that the reinforcing zone is integral with one of said other contact pads (C'4, C'8).

7. Module according to claim 5, characterized in that the reinforcing zone is integral with one of the contact pads (C1, C2, C3, C5, C6, C7) of one of the series.

8. Module according to claim 5, characterized in that the reinforcing zone (Z) is electrically insulated with respect to each of the contact pads.

9. Module according to claim 4, characterized in that the reinforcing zone is integral with one of said other contact pads (C'4, C'8).

10. Module according to claim 4, characterized in that the reinforcing zone is integral with one of the contact pads (C1, C2, C3, C5, C6, C7) of one of the series.

11. Module according to claim 4, characterized in that the reinforcing zone (Z) is electrically insulated with respect to each of the contact pads.

12. Module according to claim 11, characterized in that the reinforcing zone has, parallel to said direction of the carrier film, a dimension greater than that of the contact pads located in the middle of the series of contact pads.

13. Module according to claim 1, characterized in that said other two contact pads (C'4, C'8) are dedicated to a USB communication function.

14. Module according to claim 1, characterized in that the connecting terminals (210) of the component to which the eight contact pads are connected are distributed in two parallel series of four connecting terminals.

15. Smart card comprising a module according to claim 1, comprising a card body (104, 204) in which a cavity is made that has a deep part (204B) suitable for receiving the electronic component, which is surrounded by a peripheral part (204A) of smaller depth to which the module is fixed by its periphery.

16. Card according to claim 15, characterized in that all eight contact pads are opposite this peripheral part.

17. Card according to claim 16, the body of which has dimensions smaller than those of the 3FF format.

18. Card according to claim 15, the body of which has dimensions smaller than those of the 3FF format.

19. Reader configured for connecting to at least one of said other contact pads (C'4, C'8) of a module as defined by claim 1.

20. Smart card microcircuit module comprising: a carrier film (101, 201) of overall rectangular shape provided on a first face with eight contact pads suitable for being brought in contact with an external element and, on a second face, with an electronic component (205) equipped with connecting terminals (210) for connection through the carrier film, these eight contact pads being arranged in two parallel series of three contact pads (C1, C2, C3, C5, C6, C7) between which two other contact pads (C'4, C'8) are situated, these series of contact pads each being aligned parallel to one and the same direction of the carrier film in such a way that the contact pads of one of the series are respectively opposite, transversely to said direction, to the contact pads of the other of the series, the other two contact pads being respectively positioned near the contact pads forming the ends of each of the series, the contact pads each having, parallel to said direction, a dimension of at least 1.7 mm and, transversely to this direction, a dimension of at least 2 mm, the contact pads of the two parallel series complying with the provisions of standard ISO 7816 as regards the pads denoted C1 to C3 and C5 to C7 in this standard, these eight contact pads jointly bordering each of the respective sides of the carrier film and each being adjacent to two others of the eight contact pads and electrically insulated therefrom.

* * * * *